Aug. 4, 1942.  N. F. HUBER  2,291,626
ONE UNIT SAFETY TRAILER
Filed Jan. 19, 1940  4 Sheets-Sheet 2
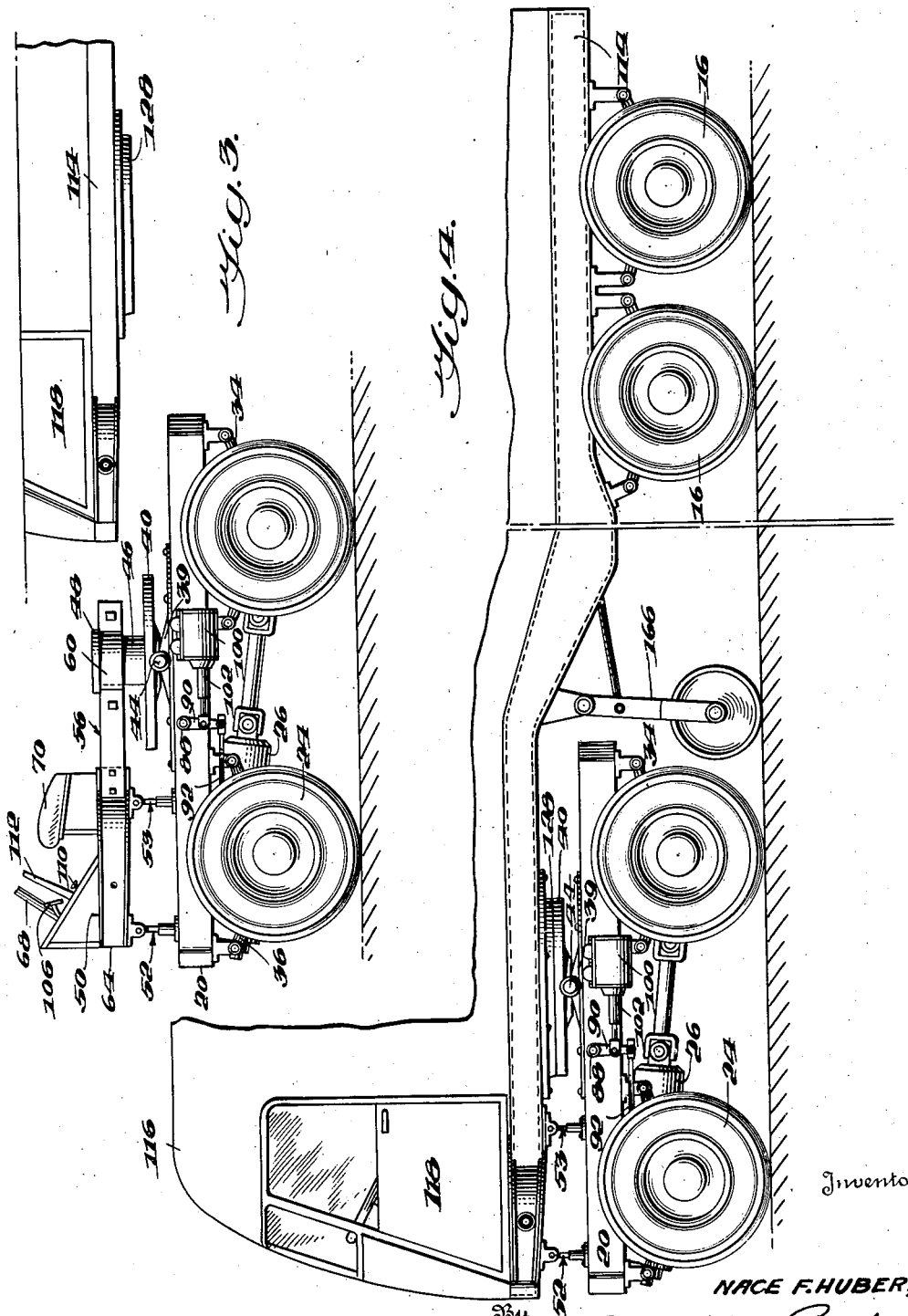

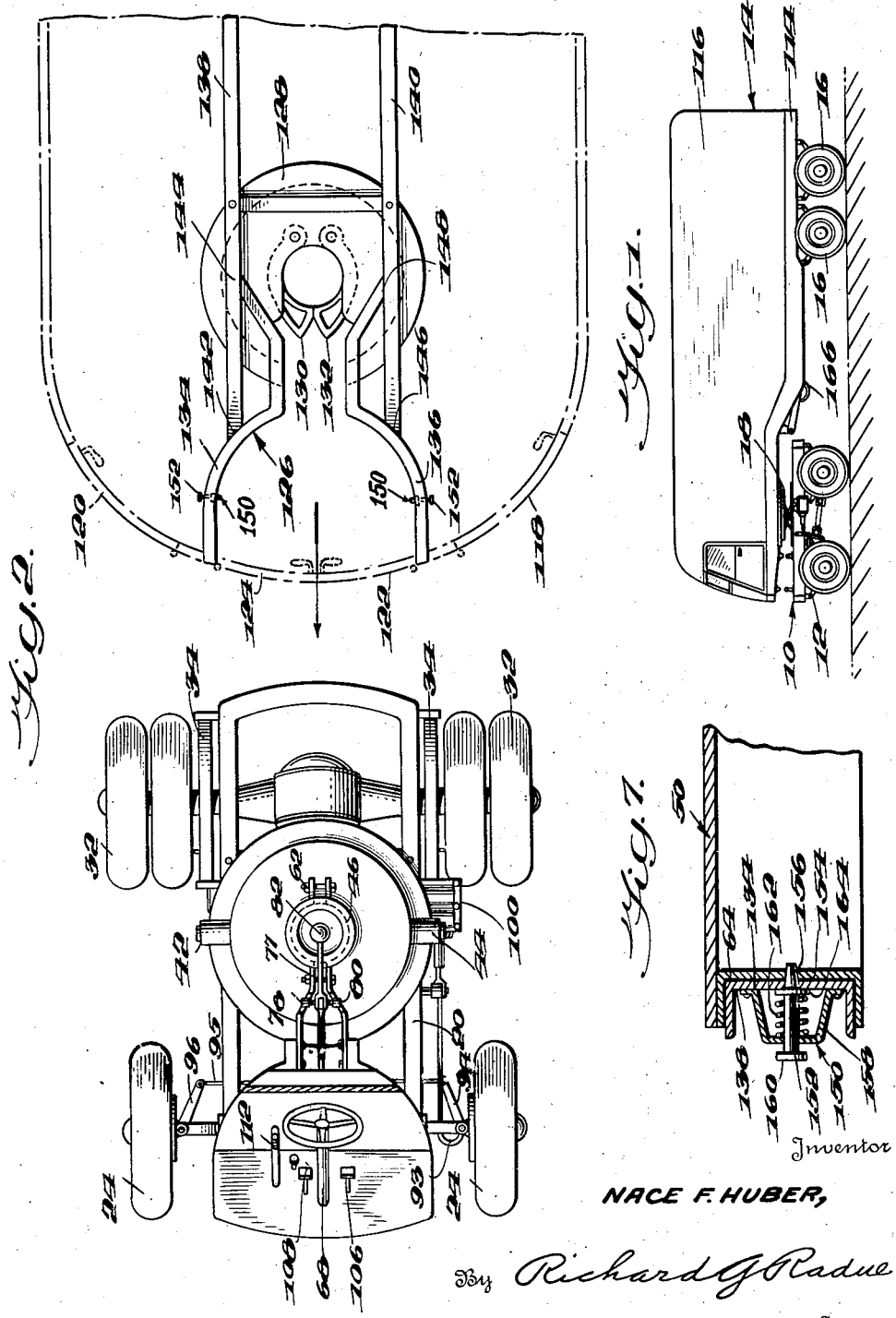

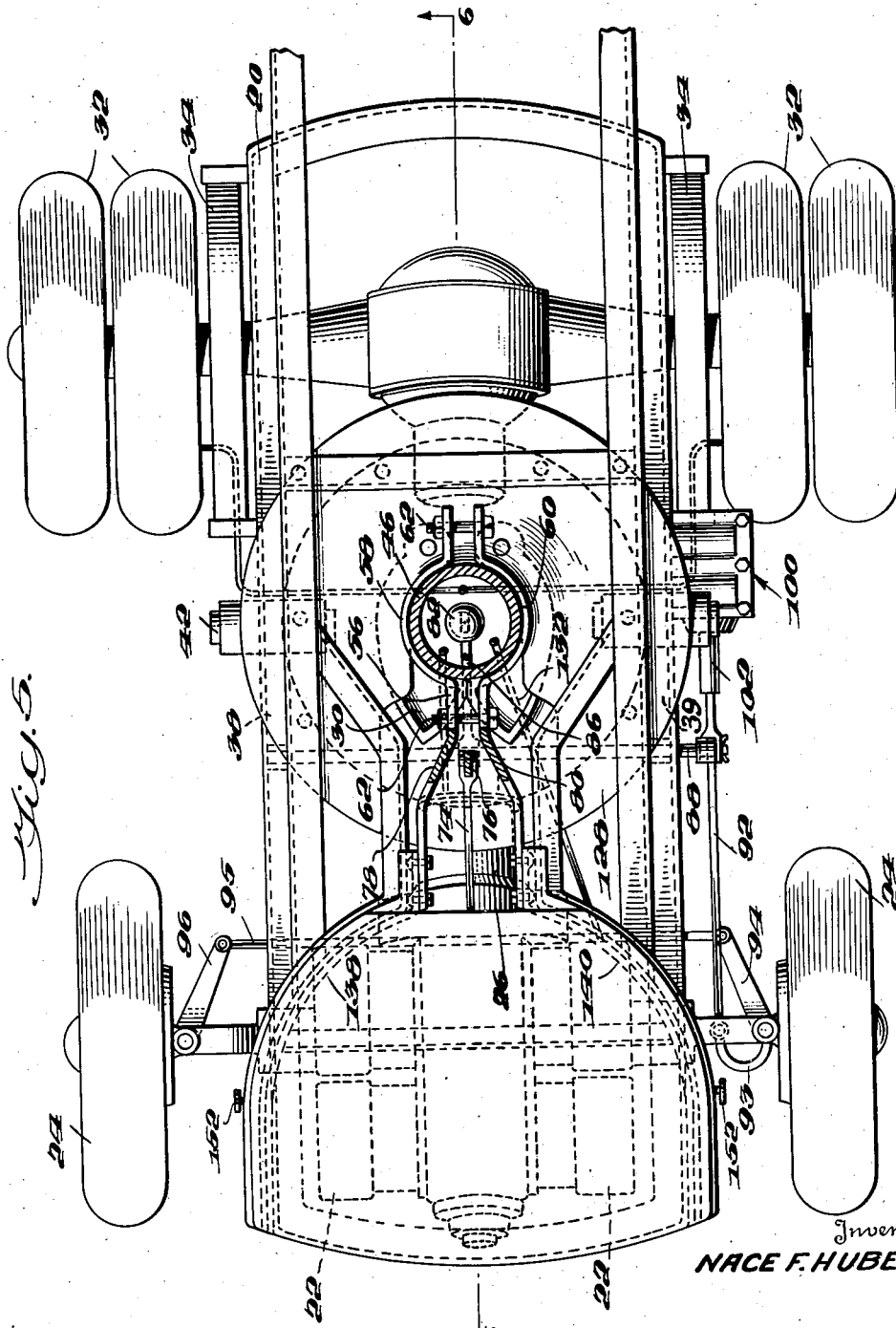

Aug. 4, 1942.    N. F. HUBER    2,291,626
ONE UNIT SAFETY TRAILER
Filed Jan. 19, 1940    4 Sheets-Sheet 4
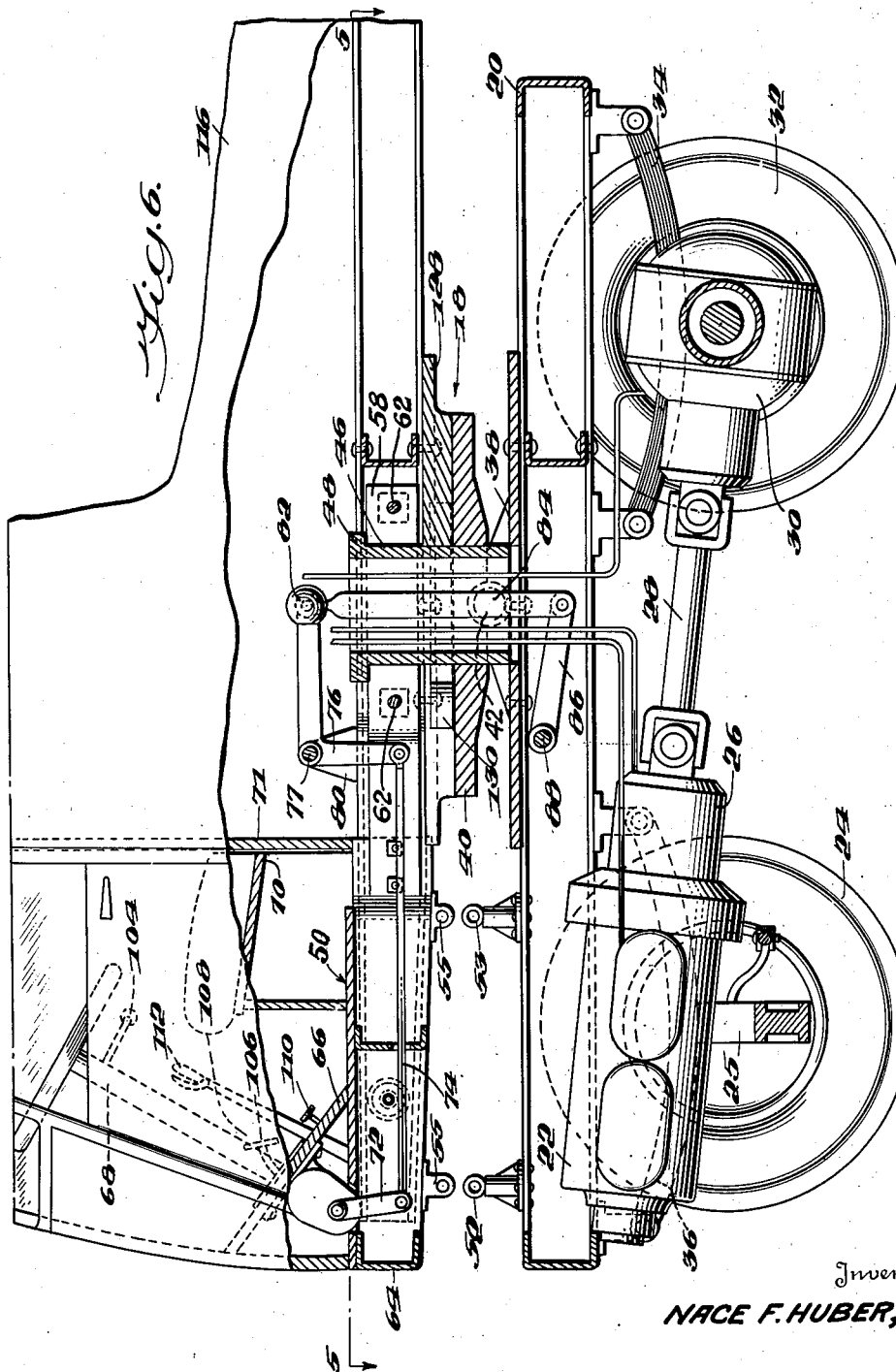
Inventor
NACE F. HUBER,
By Richard G Radue
Attorney Patented Aug. 4, 1942

2,291,626

UNITED STATES PATENT OFFICE 2,291,626

ONE-UNIT SAFETY TRAILER

Nace F. Huber, Louisville, Ky.

Application January 19, 1940, Serial No. 314,716

16 Claims. (Cl. 180—11)

The invention to be described relates to a motor vehicle and trailer combination which is adapted particularly to the transportation of freight loads.

Hitherto such highway transportation combinations have comprised a conventional tractor chassis with an operator's cab and controls mounted on its forward end and carrying a fifth wheel connection at its rear end for coupling to a trailer of the van type. The fundamental objections to this arrangement are the tendency to whip or weave and to jackknife when negotiating a turn at high speed; the unsatisfactory distribution of load with respect to the front and rear wheel tire capacities of the tractor or motor vehicle unit; and the detachment existing between the cab for the driver and the body of the trailer. To obviate some of these difficulties, it has in more recent years been proposed to locate the operator's seat and the controls for the tractor unit within the forward part of the trailer and to accommodate the relative angular motion between the trailer and tractor by connecting the seat and controls rigidly to the tractor only. This latter arrangement at best is also a makeshift, and is open to the further objection that relative motion adjacent the operator creates a danger hazard.

Generally stated, it is the object of this invention to provide a safe truck vehicle in which the tractor unit is included within the overall length of the van or the one unit member, the tractor unit being entirely self-contained except for controls and detachable from the van body or unit with the controls thereof as a fully controlled, self-propelled vehicle.

A principal object of this invention is to provide an improved, unitary combination in which the trailer is connected to the tractor unit so that the front and rear wheels of the former are properly loaded and the advantages of having the driver in a trailer cab are obtained without the disadvantages of relative motion at his station. This is accomplished by the provision of a seat and control platform which is adapted to be made a part of the trailer when that unit is coupled to the tractor unit, and an integral part of the tractor when the latter is to be separated from the trailer.

In the accomplishment of the main objects, a further feature of the invention is to be found in the disposition of the operator's seat in an elevated and forward place so as to give full visibility. Equally important is the fact that there is a very definite safety factor added by the elevation of the operator above the collision impact level for a majority of motor vehicles.

Another advantage which inheres in the novel unitary combination of this invention is the elimination of blind rear vision periods occurring when the rear end of the trailer swings across the normal field of the rear vision mirror, which is necessarily located on the inner side of the tractor with respect to the center of the road.

Other features of improvement will be recognized in the marked increase in load carrying capacity for a given length which is attained by having the forward end of the trailer substantially coincide with the corresponding end of the tractor when the two are interconnected. It is believed that this feature will result ultimately in a marked reduction in highway accidents by reason of the fact that there is less hazard in passing the unitary truck combination of the present invention, which also is of reduced length, than that attendant upon passing the relatively separate tractor with cab and trailer unit which characterizes the present highway freight transportation equipment.

Further features of novelty are to be found in the arrangement of steering mechanism and other controls, which extend through the fifth wheel so as to permit ready replacement of a tractor unit.

It will be noted in addition that the power unit of the tractor is so disposed as to permit the optional connection of the operator's platform, including the steering wheel, seat, and controls, with either the tractor or the trailer for movement therewith; and at the same time the power unit or engine is mounted for short coupling with the driving wheels and rearwardly of the front end of the tractor unit.

The integrated trailer and tractor construction which has been outlined in part lends itself to the use of a continuous bed frame extending from end to end of the trailer unit and its included cab, with suitable reinforcement where connection is made to the operator's platform. Within the contemplation of this invention, the portion of the trailer bed frame which is over the tractor unit may be sprung up in order to increase the load capacity for a limited height.

Other novel details comprising distinct improvements will be apparent and understood from reading the following detailed description of a preferred embodiment of the invention in connection with the accompanying drawings, in which Fig. 1 shows the complete motor vehicle and trailer combination in side elevation;

Fig. 2 is a plan view of the vehicle or tractor unit slightly separated from the forward end of its trailer;

Fig. 3 is a side elevation of the tractor unit and the forward end of the trailer in a separated position similar to that of Fig. 2 but with certain details of the steering mechanism omitted;

Fig. 4 represents a detailed side elevation of the tractor unit and trailer at the time of coupling or uncoupling;

Fig. 5 is a plan view to a somewhat larger scale of the tractor unit with the forward end of the trailer connected thereto;

Fig. 6 shows a vertical section taken on the line 6—6 of Fig. 5; and

Fig. 7 is a detailed fragmentary section showing the nature of the connection between the driver's platform and the adjacent portion of the trailer.

With reference to Fig. 1, the numeral 10 designates a tractor or motor vehicle unit having a wheeled chassis 12. A trailer unit or van 14 provided with suitable rear supporting wheels 16 is coupled to the tractor 10 by a separable fifth wheel connection 18.

As seen in Figs. 5 and 6, the wheeled chassis of the motor vehicle unit includes a frame 20 which supports a motor in the form of an internal combustion engine 22 beneath the forward end of said frame and between a pair of front steering wheels 24, 24 mounted on a drop center axle 25. In line with the motor 22 is a standard transmission 26 which is connected in an ordinary manner by a short drive shaft 28 to a rear end or differential 30 which drives the dual rear wheels 32, 32. When desirable, the dual wheels of each pair may be differentially driven. Conventionally mounted rear springs 34, 34 and front springs 36, 36 also are essential elements of the chassis 12.

The fifth wheel connection 18 comprises lower plates 38 and 39 rigidly secured to opposite sides of the frame 20 and an upper circular plate 40 which is pivotally mounted in trunnion fashion on the respective plates 38 and 39 by means of the horizontal pins or bearings 42, 44. A hollow king pin or center pin 46 extends concentrically through the upper circular plate 40 of the fifth wheel to which it is detachably connected by any suitable means, and has an outwardly extending flange 48 formed at its upper end for a purpose now to be described.

Figs. 2 and 3 show an important feature of this invention in the way of an operator or driver's platform 50 which is supported a substantial distance above the tractor chassis frame 20 by means of appropriately spaced and detachable jacks 52, 53 which are adapted to be securely connected to both sides of the frame and platform. Although only two of these jacks or supporting means 52, 53 show in the drawings (Fig. 6), there is a corresponding pair on the opposite side of the tractor frame 20. The jacks or supporting means 52, 53 are illustrative and may obviously be of the familiar differential screw or hydraulic variety. Horizontally inserted removable pins of any desired type (not shown) may be used conveniently to connect the jacks to depending lugs 55, 55 on the platform 50. In all events the jacks or other means when disconnected and retracted, or removed, must afford ample clearance for relative movement of the trailer-connected platform 50 and the tractor frame 20.

The driver's platform 50 has a rearward extension 56 formed by a pair of spaced metal strips 58 and 60 which encircle the center pin 46 below the flange 48 and are clamped loosely at opposite sides by means of bolts 62, 62. It will be seen that the platform 50 comprises a channel frame 64 which is spanned by a floor construction 66 supporting a steering wheel column 68 and a driver or operator's seat 70. A straight transverse partition 71 may be removably associated with the trailer 14 rearwardly of seat 70, as shown in Fig. 6, in order that the trailer can be conveniently and efficiently loaded without waste space of irregular shape. The partition 71 will also permit uncoupling of the operator's platform 50, as will appear subsequently.

In Fig. 6, there is indicated a crank 72 which is suitably geared by means not shown in detail to the steering column 68 and pivotally connected to a rod 74 which extends horizontally of the platform 50 within the frame 64 to a bell crank lever 76 mounted on a horizontal transverse rod 77 for rotation therewith. It will be observed in Fig. 2 that the transverse rod or shaft 77 is pivotally supported at 78 and 80 on opposite sides of the platform frame extension 56. A universal connection such as a ball bearing swivel joint socket 82 joins the other arm of the bell crank lever 76 to a vertical link or rod member 84 extending through the hollow center pin 46, as illustrated in Fig. 6. Any suitable cover may be provided for the inwardly exposed parts of the lever 76 and socket 82. At its lower end, which is below the fifth wheel, the vertical link 84 is pivotally connected to a crank 86 turning with a horizontally disposed shaft 88 extending across the tractor chassis frame 20 and outwardly thereof on the left side so as to operate a second depending crank 90 which is pivotally connected, as by a ball joint, to an ordinary drag link 92 (Fig. 4). By means of the drag link 92, a steering arm 93 (Fig. 5) on the left front wheel 24 may be turned, and through a tie rod linkage indicated generally as 94, 95, 96, the right front wheel 24 is caused to correspond in movement. Adjacent the rearward end of the drag link on the left side of the tractor frame 20 is an air booster 100, such as is manufactured for this purpose by Bendix-Westinghouse Air Brake Company, with its piston rod 102 linked to the vertical crank 90 intermediate its ends, for increasing the steering effort applied to the front wheels.

The specific motor controls form no part of the invention, but will be indicated somewhat briefly in the interest of completeness. Mounted on the steering column 68, which is shown in Figs. 2 and 6, is a magnetic gear shift control 104, and in proper relation to the driver's seat 70 is a clutch pedal 106 which through commonly used fluid pressure or magnetic means controls the drive of the tractor unit 10. A brake pedal 108 is mounted adjacent the clutch pedal 106 and mechanically connected to a fluid pressure piston (not shown) which controls the hydraulic or air brakes. Note is to be made also of a throttle or accelerator 110 which is flexibly connected through the king pin 46 to the carburetor of the engine 22. Preferably, an emergency brake lever 112 is cable-connected to the auxiliary set of brakes. All of the control connections which have been mentioned pass through the fifth wheel center pin 46, as shown by Figs. 5 and 6, and are appropriately separated from the steering link 84 so as to prevent damage or entanglement.

For purposes of illustration, the trailer unit 14 has been shown as a van with a sprung frame 114 having its elevated portion at the front end to accommodate the tractor unit 10 and the fifth wheel 18. The frame 114 carries a closed body portion 116, the details of which are unimportant for present purposes, having a left cab door 118 and a right cab door 120 connected to opposite sides of its front end. The arrangement of the doors 118 and 120 is clearly illustrated in Fig. 2 which shows also in dotted lines a pair of hinged or otherwise connected forward doors 122 and 124 respectively which may be swung apart and together to give access to the front end of the trailer unit for the purpose of coupling or uncoupling the same to a tractor unit 10. Fig. 2 further indicates a notch or recess 126 in the forward end of the frame structure 114 of the trailer, shaped to guide and snugly receive the driver's platform 50 which has been described. An open fifth wheel plate 128 is mounted at the bottom of the notch 126 and slightly therebelow for receiving the king pin 46 which is associated with the fifth wheel member 40 of the tractor unit 10. Any suitable locking means for the king pin 46 may be employed, such as that shown in Fig. 2, wherein a pair of pivoted locking latches 130, 132 are slidable in an enlarged recess (not shown) provided in the under portion of the open fifth wheel plate 128.

The notch or recess 126 of the trailer is defined by a pair of curved channel frames 134, 136 which face outwardly and are integrated with a spaced pair of parallel, longitudinal frame members 138, 140 of the trailer. That is to say, the frame member 138 is rigidly connected in the manner shown to the channel frame 134 at its forward end 142 and rearwardly thereof at 144. Similarly, the longitudinal frame member 140 is connected to the opposite curved channel frame 136 at 146 and 148. This results in a continuous and rigid bed frame structure (114) for the trailer unit, and one which extends beyond the position of the operator to the forward end of the included tractor 10.

While Fig. 2 serves to show the position of a plurality of spaced locking devices 150 which secure the driver's platform 50 to the trailer when the latter is coupled to the tractor 10, the nature of these devices is better shown in the detail of Fig. 7. Each locking device 150 comprises a tapered plunger member 152 carried by the trailer channel frame 134, or 136, and extending inwardly through aligned apertures 154 and 156, the latter one being in the mated portion of the channel frame 64 of the driver's platform. A housing 158, which may be of sheet metal, surrounds the plunger 152 and is attached to the outer face of the trailer frame member 134. However, a head or knob 160 of each plunger is disposed without the housing 158 so that said plunger may be operated against the resistance of a coil spring 162 which is interposed between the inside of the housing and an intermediate shoulder 164 of the plunger. By means of these locking devices 150, the driver's platform can be quickly and securely coupled to the interfitting part of the trailer frame, or released therefrom when the tractor 10 and trailer 14 are to be separated.

From the foregoing description of the motor vehicle and trailer combination of this invention, it is believed that most of the details of its operation will have been made clear. In summary, it is observed that the tractor unit 10 is connected to the trailer 14 by opening the forward doors 122 and 124, the trailer 14 being at this time supported at its forward end by a retractible landing gear 166 of well-known construction, and backing the tractor unit under the frame 114 of said trailer. While this is being done, the driver's platform 50 and its supporting frame 64 will be connected to the tractor chassis frame 20 by means of the detachable jacks 52 and 53, and the operator will be in his seat 70 on the tractor unit and operating it in normal fashion. The platform 50 is always secured to the tractor chassis 20 through the pivotal connection of its rearward extension 56 to the center pin 46 of the fifth wheel means. Upon mating of the platform frame 64 and the recessed portion 126 of the trailer frame, the two will be automatically connected by the snapping into place of the tapered plungers 152 of the locking devices. These plungers 152 will have first been retracted by pressure action of the platform frame 64 adjacent its apertures. It then remains only to lock the center pin 46 in position with the latches 130, 132, close the forward cab doors 122 and 124, detach the jacks 52 and 53 from the platform frame so as to permit relative motion and provide clearance therefor, and couple the brake system of the trailer 14 to that of the tractor 10. Although no previous mention has been made of this detail, it will be appreciated that the brakes of the trailer also can be operatively connected through the hollow center pin of the tractor, as can also its lights.

The dominant aspects of the combination thus produced are its safety and economy, as measured by load-carrying capacity. Without sacrificing any interchangeability of tractor units, the trailer and tractor components of such combinations have been united into one highly practical unit.

In so doing, the waste space has been reduced to the portion of length occupied by the operator and the vehicle controls. The cab for the operator, which is included in the forward portion of the trailer without any intervening space, has been placed over and to some extent forward of the front axle of the tractor, and materially elevated, with the result that the operator has a position of vastly improved visibility and personal safety. It should be self-evident that the operator will have unobstructed vision even immediately in front of his cab, and that his increased elevation will lengthen the range of forward visibility and permit the earlier viewing of the far side of a hill which is being climbed. Of particular significance is the described manner of connection in which the possibility of a trailer unit breaking loose and running over the driver has been eliminated. One of the further safety features is the way in which the motor or engine has been located so as not to add to overall length or to liberate poisonous gases where they would be a menace to the operator. Moreover, the relative forward position of the fifth wheel with respect to the tractor unit is such as to prevent jack-knifing, by reason of the fact that the trailer is pushed rather than pulled.

Those who are familiar with this art will recognize that various changes may be made in the details of the present embodiment of this invention which will fall within the spirit and scope of the appended claims.

Having thus described my invention, what I claim as new and desire to secure by Letters Patent of the United States is:

1. A unitary transportation vehicle comprising, in combination, a trailer unit; a tractor unit which extends below the trailer unit; fifth wheel connecting means between the units; and tractor control means detachably secured to the trailer unit for movement therewith relative to the tractor unit, said tractor unit being self-contained except for its control means and detachable with its controls from the trailer unit as a complete, self-propelled vehicle, and the trailer unit being provided with an open-sided recess at its forward end arranged to receive the tractor control means.

2. In combination, a tractor unit; a trailer unit; fifth wheel means for coupling the tractor and trailer units; a platform for a driver constructed and arranged to be secured immovably to either unit; connecting means which are separable for securing the platform to the tractor unit for movement therewith and relative to the trailer unit; and fastening means for optionally joining the platform to the trailer unit for movement therewith.

3. A unitary transportation vehicle comprising in combination, a trailer unit; a tractor unit included within the overall length of the trailer unit; fifth wheel connecting means between said units; a driving platform including tractor control means and constructed and arranged to be secured to the trailer unit for rotational movement therewith relative to the tractor unit, said platform having an integrally connected extension pivotally connected to the tractor for rotation about the vertical axis of the fifth wheel connecting means; connecting means which are separable for securing the platform to the tractor unit for independent movement therewith; and fastening means for optionally joining the platform to the trailer unit for rotational movement therewith relative to the tractor unit.

4. In combination, a tractor unit; a trailer unit including a cab at its front end; fifth wheel means for coupling the tractor and trailer units and arranged so that the cab of the trailer unit will be over the forward end of the tractor unit; a platform for a driver constructed and arranged to be secured immovably to either unit; connecting means which are separable for securing the platform to the tractor unit for movement therewith; and fastening means for optionally joining the platform to the trailer unit for movement therewith relative to the tractor unit.

5. The combination which comprises a tractor unit having forward steerable wheels and rear driving wheels; a trailer unit adapted to have its forward end supported by the tractor unit; fifth wheel means adapted for coupling the trailer unit to the tractor unit intermediate the steerable and driving wheels of the latter; a platform for a driver constructed and arranged to be secured immovably to either unit; connecting means which are separable for supporting the platform on the tractor unit for movement therewith; and fastening means for optionally connecting the platform to the forward end of the trailer unit for movement relative to the tractor unit, said trailer unit being recessed to accommodate the platform.

6. The combination which comprises a tractor unit having forward steerable wheels and rear driving wheels; a van trailer unit adapted to have its forward end supported by the tractor unit; fifth wheel means adapted for coupling the trailer unit to the tractor unit intermediate the steerable and driving wheels of the latter; a platform for a driver constructed and arranged to be secured immovably to either unit; connecting means which are separable and including jack means for supporting the platform on the tractor unit for movement therewith; and reciprocating fastening means on the trailer unit for connecting the platform to the forward end of the trailer unit, said trailer unit being recessed to accommodate the platform.

7. The combination which comprises a tractor unit having forward steerable wheels and rear driving wheels; a trailer unit adapted to have its forward end supported by the tractor unit; fifth wheel means adapted for coupling the trailer unit to the tractor unit; a platform for a driver constructed and arranged to be secured immovably to either unit; connecting means which are separable and including jack means for supporting the platform on the tractor unit for movement therewith; and retractible fastening means arranged for connecting the platform to the forward end of the trailer unit, said trailer unit being recessed to accommodate the platform.

8. The combination which comprises a tractor unit having forward steerable wheels and rear driving wheels; a trailer unit adapted to have its forward end supported by the tractor unit; fifth wheel means adapted for coupling the trailer unit to the tractor unit intermediate the steerable and driving wheels of the latter; a platform for a driver constructed and arranged to be secured immovably to either unit; connecting means which are separable for supporting the platform on the tractor unit for movement therewith; and fastening means for optionally connecting the platform within the forward end of the trailer unit for movement therewith relative to the tractor unit, said tractor and trailer units being provided respectively with channel frames which mate when the platform is secured to the trailer unit.

9. In combination, a motor vehicle provided with a chassis frame, a pair of forward steering wheels, an internal combustion motor mounted between said steering wheels and below the adjacent portions of said frame, and rearward driving wheels operatively connected to said motor; a trailer having supporting wheels adjacent its rear end and a platform including a steering and other essential controls for vehicle operation forming a part of its forward end; a fifth wheel connection between the vehicle and trailer, said fifth wheel connection being disposed intermediate the driving and steering wheels of the motor vehicle and rearwardly of the platform on the trailer.

10. In combination, a motor vehicle provided with a chassis frame, a pair of forward steering wheels, an internal combustion motor mounted between said steering wheels and below the adjacent portions of said frame, and rearward driving wheels operatively connected to said motor; a trailer having supporting wheels adjacent its rear end and a platform including a steering and other essential controls for vehicle operation forming a part of its forward end; and a fifth wheel connection between the vehicle and trailer, said fifth wheel connection being disposed intermediate the driving and steering wheels of the motor vehicle and the forward ends of the motor vehicle and trailer being in substantially vertical coincidence.

11. In combination, a tractor unit; a trailer unit; fifth wheel means for coupling the tractor and trailer units; a readily detachable platform for a driver adapted to be secured immovably to either unit for movement therewith relative to the other unit; and control means for the tractor including a steering linkage extending substantially coaxially through the fifth wheel means and secured to the platform for removal therewith.

12. A motor vehicle comprising, in combination, a tractor unit; a trailer unit; fifth wheel means for coupling the tractor and trailer units; a readily detachable platform adapted to be secured immovably to either unit for movement therewith relative to the other unit; and control means for the tractor including a steering connection extending within the fifth wheel means and secured to the platform for removal therewith.

13. In combination, a tractor unit; a trailer unit; fifth wheel means including a hollow center pin for coupling the tractor and trailer units; a readily detachable platform for a driver adapted to be secured immovably to either unit, for movement therewith relative to the other unit, said center pin being carried by the tractor unit; connecting means which are readily separable for securing the platform to the tractor unit for movement therewith; fastening means for joining the platform to the trailer unit for movement therewith; and steering control mechanism extending from the tractor unit through the center pin and supported by the platform.

14. As a sub-combination, a van type of trailer unit comprising a bed frame extending continuously from end to end of said unit and being sprung upwardly at its forward end and having an open-sided recess arranged to accommodate a portion of a tractor unit; rear supporting wheels therefor; side cab doors oppositely disposed adjacent the front end of said trailer unit; and additional door means at the front end of the trailer unit to permit entrance and removal of a steering wheel and other control elements associated with the tractor unit.

15. A unitary transportation vehicle comprising, in combination, a trailer unit of the van type having a cab portion at its forward end and a continuous frame extending thereunder; a replaceable tractor unit having forward steerable wheels and rearward driving wheels beneath the trailer unit; an internal combustion motor positioned between the steerable wheels of said tractor unit; fifth wheel means for connecting the units, one part of said means being pivotally supported by the tractor unit in advance of its driving wheels and another part of said means being rigidly secured underneath the trailer unit; and control means having a permanent pivotal connection with the tractor unit and detachably secured within the cab portion of the trailer unit for turning movement with said trailer unit about the fifth wheel means and relative to said tractor unit.

16. A unitary transportation vehicle comprising, in combination, an interchangeable tractor unit including forward steerable wheels, rearward driving wheels, and an internal combustion motor therefor arranged between the steerable wheels; a trailer unit including a van body and an operator's cab forming a part of said van body at its forward end; connecting means between the tractor unit and trailer constructed and arranged to accommodate relative rotational movement between said units; an operator's platform forming a part of the tractor unit and adapted to be secured to the trailer unit within its cab for rotational movement with said trailer unit; and controls for the tractor unit extending from the platform and constructed and arranged to permit the required relative motion.

NACE F. HUBER.